United States Patent [19]
Symanow et al.

[11] Patent Number: 6,005,488
[45] Date of Patent: *Dec. 21, 1999

[54] USER CONTROL INTERFACE ARCHITECTURE FOR AUTOMOTIVE ELECTRONIC SYSTEMS

[75] Inventors: David Anthony Symanow, Plymouth; David Bryan Gulau, Livonai; Paul Michael Progar, Plymouth; Jeffrey Neil Golden, Beverly Hills; Douglas Brian Gillespie, Sterling Heights, all of Mich.

[73] Assignee: Ford Motor Company, Dearborn, Mich.

[*] Notice: This patent is subject to a terminal disclaimer.

[21] Appl. No.: 08/984,511

[22] Filed: Dec. 3, 1997

[51] Int. Cl.$^6$ ...................................................... H04Q 5/22
[52] U.S. Cl. ................................ 340/825.56; 340/825.22; 341/22; 341/23; 341/176; 345/902
[58] Field of Search .......................... 340/825.22, 825.5, 340/825.69, 825.72, 525; 341/22, 23, 176; 345/902; 348/12, 13; 455/259

[56] References Cited

U.S. PATENT DOCUMENTS

| | | |
|---|---|---|
| 4,792,783 | 12/1988 | Burgess et al. . |
| 4,833,594 | 5/1989 | Familetti et al. . |
| 4,906,117 | 3/1990 | Birdwell . |
| 5,003,200 | 3/1991 | Sakamoto . |
| 5,278,547 | 1/1994 | Suman et al. . |
| 5,473,267 | 12/1995 | Stansfield . |
| 5,486,724 | 1/1996 | Periou et al. . |
| 5,486,817 | 1/1996 | Ina . |
| 5,508,689 | 4/1996 | Rado et al. . |
| 5,581,130 | 12/1996 | Boucheron . |
| 5,602,582 | 2/1997 | Wanderscheid et al. ................. 348/12 |

FOREIGN PATENT DOCUMENTS

| | | |
|---|---|---|
| 0-104-865-A2 | 4/1984 | European Pat. Off. . |
| 0-549-242-A2 | 6/1993 | European Pat. Off. . |
| 43-27-718-A1 | 8/1993 | Germany . |
| 2-262-630 | 6/1993 | United Kingdom . |

*Primary Examiner*—Michael Horabik
*Assistant Examiner*—Jean B. Jeanglaude
*Attorney, Agent, or Firm*—Mark Mollon

[57] ABSTRACT

The software and hardware resources of an electronic system are organized in an architecture which creates a single data table in program memory for the assignment of user controls to system functions. User controls can be reassigned through appropriate modifications to this table. Thus, minor changes to the user controls can be implemented without modifying the software or hardware of the system, thereby avoiding significant development cost. Furthermore, standard products can be developed which can be customized to the needs of particular applications of the products or variations for local markets.

9 Claims, 3 Drawing Sheets

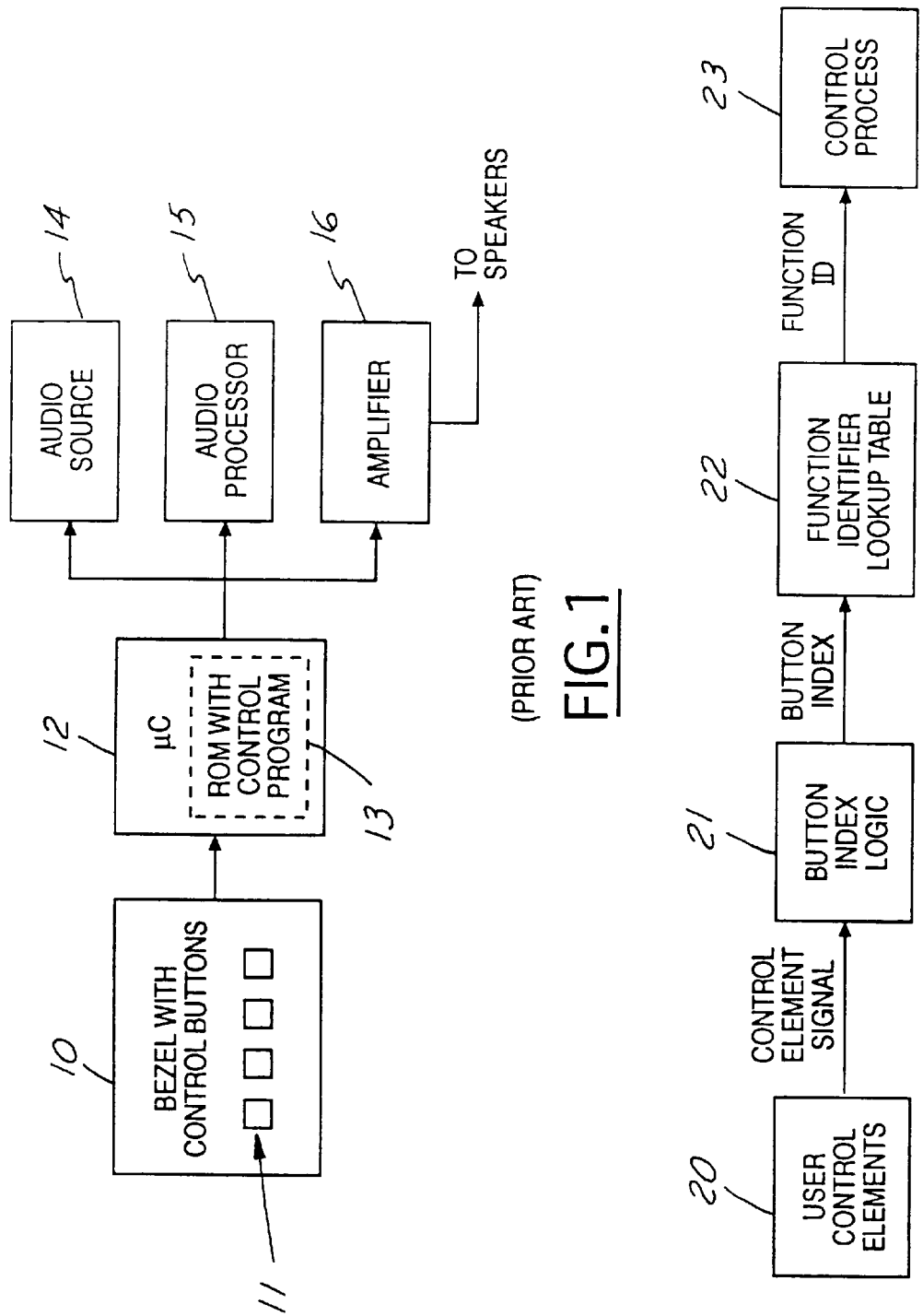

USER CONTROL INTERFACE ARCHITECTURE FOR AUTOMOTIVE ELECTRONIC SYSTEMS

BACKGROUND OF THE INVENTION

This application is related to commonly assigned, co-pending application Ser. No. (08/984,510), entitled "Method of Producing Customizable Automotive Electronic Systems", which was filed concurrently herewith.

The present invention relates in general to user controls for electronic devices and systems, and more specifically to the reprogrammable assignment of user controls for automotive electronic systems and subsystems (e.g., the push buttons and knobs on a car radio) to the specific features and functions which are to be performed in response to the user controls.

Electronic devices and systems can be produced having lower per unit cost when the device is mass produced at high volumes. In many instances, the per unit cost of manufacture continues to fall as the total number of devices increases. Nevertheless, variety must be maintained even in products of a single type (e.g., radios) for purposes of 1) product differentiation in terms of styling and/or feature content or 2) differences in product requirements in various local marketing regions or countries. Maintaining product variety reduces economies of scale and creates complexity at manufacturing plants. For example, a manufacturer of car radio subsystems may need to manufacture several different radio models because of styling differences between radios installed in various models of vehicles and because different geographic markets may require different radio features to be controllable. Each radio model may have different hardware and software which is unique to that model and which requires separate engineering development and separate manufacturing support.

An electronics manufacturer may often find it necessary to change the detailed configuration of the user control elements of existing audio, driver information, or other electronic subsystems in order to integrate the subsystem in other environments such as other car models or in response to varying market requirements. Prior art design practices use fixed assignments of user control elements to particular subsystems functions. The software and hardware design of a subsystem must be significantly modified in order to change the assignment of a user control element to a different subsystem function or to modify the number and/or layout of user control elements. Each alteration, however small, results in a new and unique part which has its own part number and associated logistical requirements. Each change requires unique development resources, testing, and manufacturing support. The cost of the modification process is significant and the resulting electrical components are not interchangeable.

SUMMARY OF THE INVENTION

The present invention has the advantage that minor changes to user control elements can be implemented without modifying the fixed control software or the hardware of a subsystem, thereby avoiding significant development cost. Furthermore, the invention enables the development of standard products that can be customized to the needs of new vehicle applications or local market requirements while using existing reprogramming equipment and manufacturing procedures.

In one aspect, the invention provides a method for operating an electronic system having a plurality of control features. One of a plurality of user control elements is activated according to a desired adjustment of a controllable feature to generate a control element signal. The control element signal is transformed into a button index signal using button index logic which assigns a unique number for each respective user input that can be produced by the user control elements. A function identifier signal is retrieved from a function identifier lookup table stored in a reprogrammable memory containing a customized mapping of button index signals into respective function identifier signals for the electronic system. The received function identifier signal is transferred to control software to perform the desired adjustment. Thus, a variety of products can be obtained by just reprogramming the function identifier lookup table (and possibly minor changes to the control panel, such as changes to the labeling of push buttons).

BRIEF DESCRIPTION OF THE DRAWINGS

FIG. 1 is a block diagram showing a prior art automotive audio system.

FIG. 2 is a block diagram showing the elements of the present invention for allowing reprogrammability of functions accessed by various user control elements of an electronic system.

DETAILED DESCRIPTION OF PREFERRED EMBODIMENTS

Figure 3:
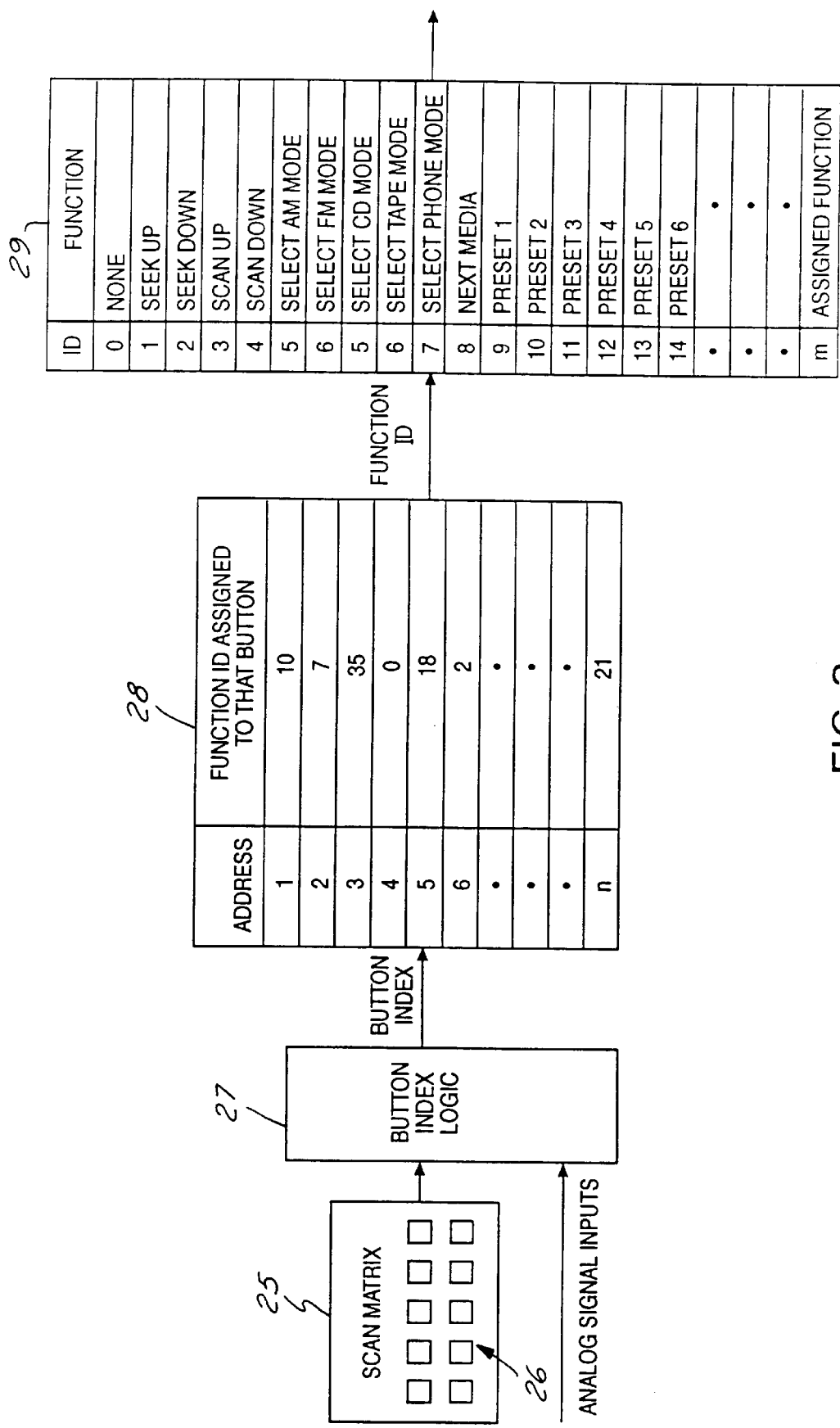
FIG. 3 is a block diagram showing the present invention in greater detail.

The present invention comprises an organization of the software and hardware resources in an electronic device, system, or subsystem including a data table in a reprogrammable memory for the assignment of user controls (e.g. elements such as push buttons and control knobs) to electronic functions of the device. The user controls can be reassigned through appropriate modifications to this table. The table is stored in electrically alterable memory that can be modified using standard equipment and procedures. In particular, the invention will be described through its application to electronic subsystems in automotive vehicles, although the invention is applicable to any mass produced electronic devices with user controls.

The purpose of the invention is to establish a flexible and simple means to assign the individual buttons and switches or knobs of an electronic subsystem (e.g., a radio, a vehicle message center, an instrumentation cluster, a remote control panel, a navigation system, etc.) to the control of specific features. The need for flexibility in assigning user control elements to controlled features results from requirements 1) to implement new control schemes for customizing the installation of a subsystem into a new vehicle model, 2) to adapt existing subsystem designs to meet feature content requirements for various market regions, 3) ensure compatibility of subsystem designs with the overall design of all of the driver controls for a vehicle, and 4) promote the reuse of existing subsystem designs to a maximum extent possible. Previous design methods require modifications to the subsystem software and/or hardware when changes are made in the assignment of user control elements to subsystem functions. Small design changes to accommodate the above requirements lead to significant increases in product cost, product line complexity, and complexity in the engineering process and manufacturing process.

FIG. 1 shows a prior art radio receiver including a front control panel or bezel 10 including a plurality of push button switches 11. Signals from the push buttons 11 are coupled to a microcontroller 12 which processes the signals in accordance with a control program stored in a read-only memory (ROM) 13. In response to the processed push-button signals, microcontroller 12 adjusts the controllable features of an audio source 14, an audio processor 15, and an amplifier 16 within the audio system.

The prior art audio system in FIG. 1 is organized such that if it is desired that one of the control push buttons would control a different feature of the radio, then, at a minimum, changes are required within the control program stored in ROM 13. Thus, small functional changes lead to significant design and manufacturing issues.

FIG. 2 shows the improved system architecture and operating method of the present invention which overcomes the above difficulties. User control elements 20 such as push buttons, switches, or knobs, generate a control element signal which is coupled to button index logic 21. In response to the control element signal, button index logic 21 generates a button index signal which is a unique digital signal (i.e., number) generically identifying the corresponding user control element. The button index signal is used as an address for pointing to a location within a function identifier lookup table 22 for obtaining a function ID signal. The function ID signal is input to a control process 23 for performing the desired adjustment of the electronic subsystem.

Looking at each block of FIG. 2 in more detail, the user control elements 20 comprise any type of known user control elements which generate either bi-state on/off signals or an analog signal. Button index logic 21 assigns a unique integer number called the button index to each discrete user control element signal and converts any analog signals into a button index by quantizing the signal based on its voltage level, frequency, or other signal attribute. All possible digital and analog signals for user action on a control element are converted into an ordered digital list of all possible desired user adjustments (e.g., turning on or off of features, adjusting radio volume, selecting an audio source, etc.). The list has entries which are sequentially numbered from 1–n, where n is the total number of recognized user inputs.

Function identifier lookup table 22 is stored in reprogrammable memory in the subsystem. This lookup table contains a mapping of button index signals to specific function ID codes. By reprogramming the lookup table, the user control architecture of the subsystem can be modified.

The method of operation of FIG. 2 is as follows. A button or control element is pressed by the vehicle driver and a discrete hard-wired bi-state signal or an analog signal is presented to button index logic 21. The bi-state signals and analog signals are transformed by the button index logic into a number in the range of 1–n. The button index signal corresponds to a unique numeric label for each control input or each desired adjustment of the controllable features of the electronic system. The button index signal is used as a pointer into the function identifier lookup table 22. Lookup table 22 has been previously programmed with a function ID code which identifies the desired adjustment in response to the activation of the control element by the driver. Finally, the function ID signal is transmitted to the subsystem control software which responds to the desired adjustment.

A key portion of this invention is that the function identifier lookup table is stored in electrically-alterable memory within the subsystem. This allows the table to be easily reprogrammed to create new mappings of subsystem buttons, switches, and input signal states to available software function identifiers. Thus, the invention enables any subsystem control input to be assigned to any subsystem function.

The present invention will be described in more detail in connection with its application to an automotive audio system as shown in FIG. 3. A radio control bezel 25 includes a plurality of push buttons 26 connected in a scan matrix which is connected to button index logic 27. In addition, one or more analog signal inputs are connected to button index logic 27. An example of analog signals would be the output from a resistive ladder, for example.

Button index logic 27 can be implemented using dedicated logic hardware or may be comprised of a predetermined program stored in the microcontroller.

A function identifier lookup table 28 is stored in electrically-alterable memory and includes a mapping transforming each address (i.e., button index) to a function identifier. Thus, lookup table 28 includes a plurality of addresses from 1–n. Each address stores a function identifier as shown which may be programmed as desired, without adding significant design and development cost. Radio subsystem control software 29 modifies its operation based on a function ID signal that is received from lookup table 28. Control software 29 may contain a master function ID table as shown or may operate without need for a master table. As shown, control software 29 may include assigned functions numbered 1–m, where m is not necessarily equal to n. Thus, control software 29 can include more adjustable functions than are accessible to the user of any particular unit. This allows a single hardware unit to be reconfigurable to perform various different functions as required by local market requirements, promoting reusability of the device.

Figure 4:
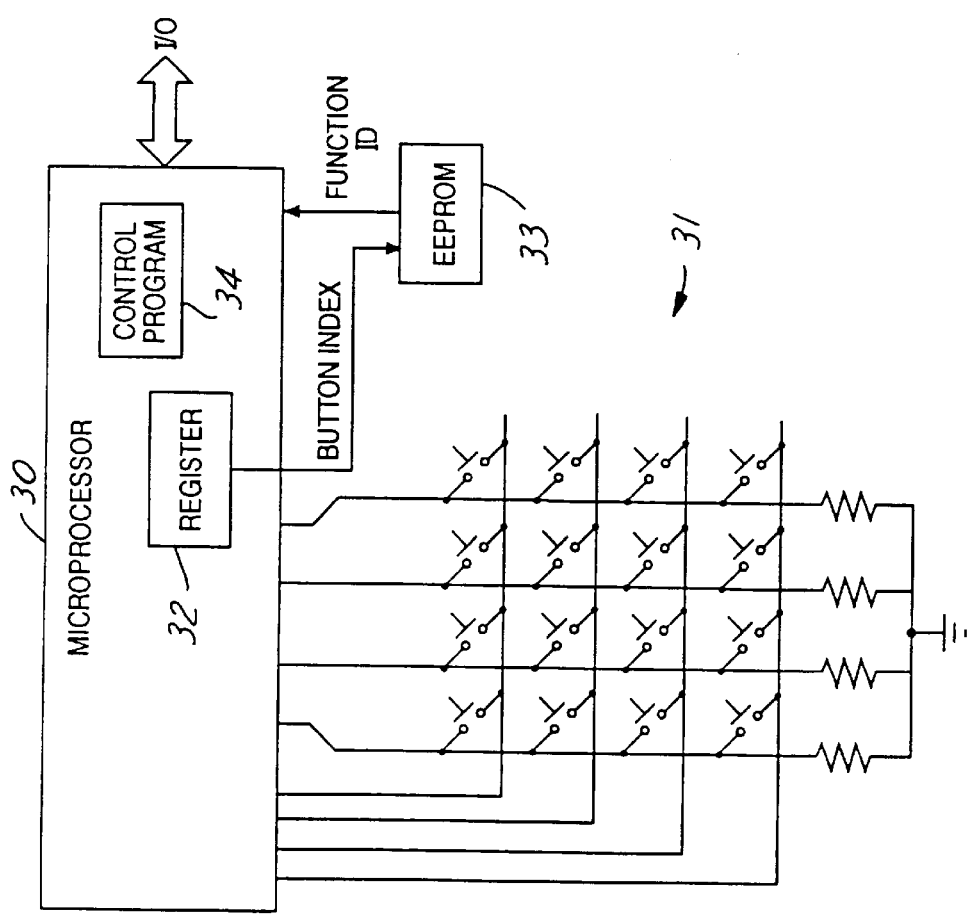
FIG. 4 is a schematic/block diagram showing an embodiment of the present invention using a scan matrix.

FIG. 4 shows a scan matrix and the corresponding button index logic in greater detail. A microprocessor 30 is connected to a 2-dimensional scan matrix 31 comprising a grid of wires organized in rows and columns. Each push button control element is connected to a unique pair of row and column signal lines which are further connected to microprocessor 30. Microprocessor 30 scans the matrix by asserting a predetermined voltage sequentially on each row signal line. When a button is pressed, that column signal line becomes connected to the corresponding row signal line. The column signals are tied to the input of a register in microprocessor 30 and a unique number is written to that register to identify which column was activated. A similar register identifies the scan row which was active. Microprocessor 30 polls the row and column registers at fixed intervals. When a value resides in the register for more than several milliseconds, the microprocessor detects that the button associated with the row and column pair has been pressed. The pair of row and column values are combined to generate a unique number which is the button index. The button index is written to a register 32 and is coupled to an electrically-erasable programmable read-only memory (EEPROM) 33 as an address pointer to retrieve a function ID from EEPROM 33. The function ID is then used by a control program 34 to generate the appropriate response to make the desired adjustment as identified by the button which was pressed.

Figure 5:
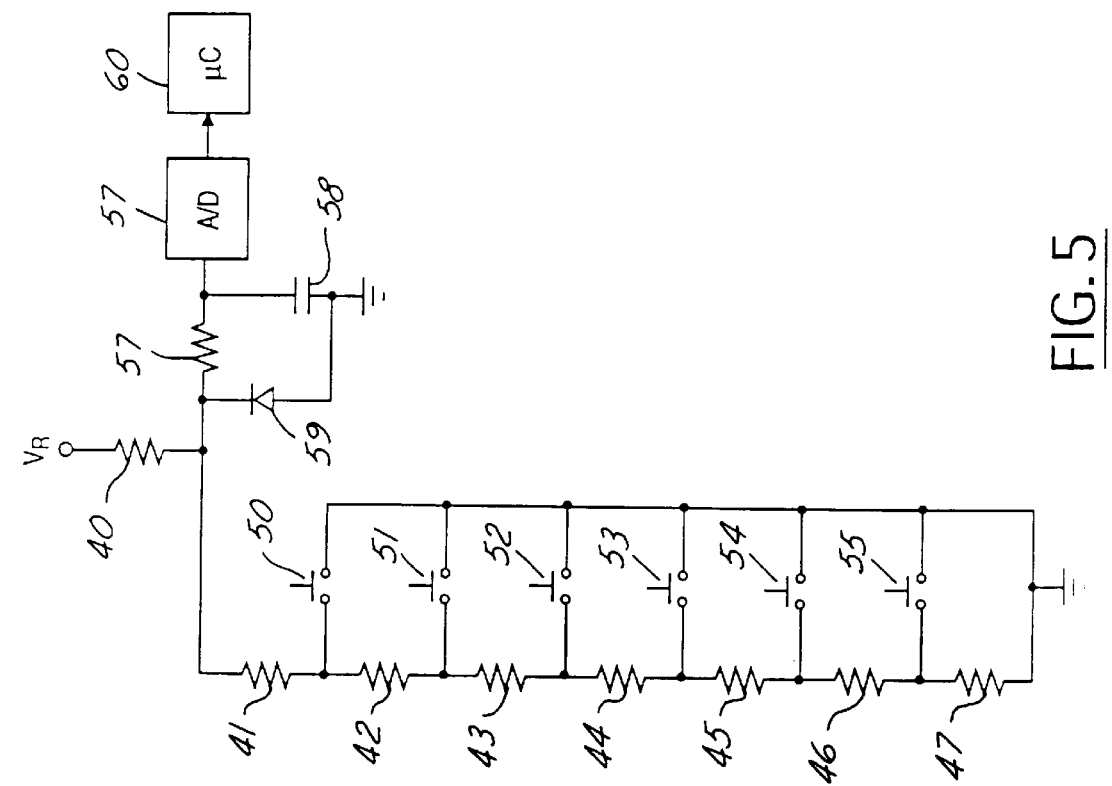
FIG. 5 is a schematic/block diagram showing an embodiment of the present invention using a resistive ladder network.

Referring to FIG. 5, an embodiment wherein user control elements are connected in a resistive ladder circuit is shown. The resistive ladder works by encoding individual button presses into unique voltages on a single analog signal line.

Thus, a plurality of resistors 40–47 are connected in series between a reference supply voltage $V_R$ and ground. A plurality of push button switches 50–55 are connected between respective junction points between resistors and ground whereby depressing any particular button bypasses a number of the resistors in the circuit so that the analog output voltage of the circuit between resistors 40 and 41 is altered. This output voltage from the resistive ladder is coupled to an analog-to-digital converter (A/D) 56 through a low pass filter including resistor 57, capacitor 58, and diode 59. The output of A/D 56 is coupled to microcontroller 60. When a button is pressed, a particular voltage is produced and is converted to a digital value by A/D converter 56. Microcontroller 60 determines which of several voltage ranges the digital value falls within. A unique number (i.e. button index) is assigned based upon which voltage range is detected.

Additional types of user input elements can be used in the present invention. For example, rotary encoders which produce distinct pulses during clockwise and counterclockwise rotation are often used to control radio tuning and audio volume. Button index logic can convert these pulses into button index signals in any convenient manner.

The function identifier lookup table of the present invention is stored in memory which can be modified using existing end-of-line programming equipment and techniques for EEPROMs, for example. Specifically, electronic systems using this technique can be reprogrammed at the subsystem manufacturing plant to reduce the complexity of manufacturing logistics used in a wide range of applications. For automotive subsystems, the programming or reprogramming could alternatively be done at a vehicle assembly plan, for example to reduce the number of unique radio types which are shipped to the assembly plant. It is also possible to allow a driver to customize the arrangement of controls used for an electronic subsystem in a vehicle. For example, the vehicle user or dealer could customize controls on a steering wheel for remote control of subsystems according to individual driver preferences. Thus, the steering wheel control panel could be interconnected with various other systems (such as the radio, climate control, and automatic speed control) and could be customized to control functions from any of the other systems.

What is claimed is:

1. A method of operating an electronic system having a plurality of controllable features, said method comprising the steps of:

activating one of a plurality of user control elements according to a desired adjustment of a controllable feature to generate a control element signal;

transforming said control element signal into a button index signal using button index logic which assigns a unique number for each respective user input that can be produced by said user control elements;

retrieving a function identifier signal from a function identifier lookup table stored in a reprogrammable memory containing a customized mapping of button index signals into respective function identifier signals for said electronic system; and transferring said retrieved function identifier signal to control software to perform said desired adjustment.

2. The method of claim 1 wherein said button index signal provides an address for indexing into said function identifier lookup table.

3. An electronic system with a plurality of controllable features, comprising:

a control bezel including a plurality of user control elements to be manually activated to adjust said controllable features;

button index logic coupled to said user control elements for generating one of a plurality of button index signals in response to a manual activation of one of said user control elements, said button index signal uniquely corresponding to one of said user control elements that was manually activated;

a reprogrammable memory storing a function identifier lookup table for a customized mapping of each one of said button index signals to a respective function identifier signal, each function identifier signal corresponding to an adjustment of a respective controllable feature; and control software stored in said electronic system, said control software performing steps to adjust a respective controllable feature in response to a function identifier signal retrieved from said reprogrammable memory when a button index signal is generated.

4. The electronic system of claim 3 wherein said user control elements comprise push buttons.

5. The electronic system of claim 4 wherein said push buttons are connected in a scan matrix.

6. The electronic system of claim 4 wherein said push buttons are connected in a resistor ladder.

7. The electronic system of claim 5 wherein said button index logic is comprised of a read/write register within a microprocessor coupled to said scan matrix.

8. The electronic system of claim 6 wherein said button index logic is comprised of an analog-to-digital converter coupled to said resistor ladder and a microprocessor.

9. The electronic system of claim 3 wherein said reprogrammable memory is comprised of electrically erasable programmable read-only memory.

* * * * *